United States Patent
Newell et al.

(10) Patent No.: US 10,178,341 B2
(45) Date of Patent: Jan. 8, 2019

(54) NETWORK-BASED EVENT RECORDING

(71) Applicant: EchoStar Technologies L.L.C., Englewood, CO (US)

(72) Inventors: Nicholas Brandon Newell, Centennial, CO (US); Omar A. Khan, Broomfield, CO (US)

(73) Assignee: DISH Technologies L.L.C., Englewood, CO (US)

( * ) Notice: Subject to any disclaimer, the term of this patent is extended or adjusted under 35 U.S.C. 154(b) by 149 days.

(21) Appl. No.: 15/057,142

(22) Filed: Mar. 1, 2016

(65) Prior Publication Data
US 2017/0257595 A1   Sep. 7, 2017

(51) Int. Cl.
| | |
|---|---|
| *H04N 5/77* | (2006.01) |
| *G11B 27/034* | (2006.01) |
| *G11B 27/32* | (2006.01) |
| *H04N 9/82* | (2006.01) |
| *H04N 5/232* | (2006.01) |
| *G11B 20/00* | (2006.01) |

(52) U.S. Cl.
CPC ............ *H04N 5/77* (2013.01); *G11B 27/034* (2013.01); *G11B 27/329* (2013.01); *H04N 5/23206* (2013.01); *H04N 9/8205* (2013.01); *G11B 20/00086* (2013.01)

(58) Field of Classification Search
CPC .... G11B 20/10527; G11B 2020/10537; G11B 2020/10546; H04N 5/772; H04N 5/77; H04N 5/2259; H04N 5/23296; H04N 5/23219
See application file for complete search history.

(56) References Cited

U.S. PATENT DOCUMENTS

| | | | | |
|---|---|---|---|---|
| 5,982,418 A * | 11/1999 | Ely | ................... | G08B 13/19619 348/153 |
| 6,833,865 B1 * | 12/2004 | Fuller | ................ | G06F 17/30247 348/231.2 |
| 7,065,250 B1 * | 6/2006 | Lennon | ................... | G06K 9/469 382/224 |
| 7,496,140 B2 * | 2/2009 | Winningstad | ............. | G07C 1/10 348/143 |
| 7,558,408 B1 * | 7/2009 | Steinberg | ............ | G06K 9/00288 340/5.53 |

(Continued)

FOREIGN PATENT DOCUMENTS

| | | | | |
|---|---|---|---|---|
| GB | 2531971 A | * | 5/2016 | ........... G03B 11/048 |
| WO | 2013/066334 | * | 5/2013 | |

*Primary Examiner* — David E Harvey
(74) *Attorney, Agent, or Firm* — Bejin Bieneman PLC

(57) ABSTRACT

A system includes a media device including a processor programmed to receive sensor data indicating a field of view of a user and adjust a field of view of a video capture device in the media device to correspond to the field of view of the user. The processor receives media data from the video capture device and stores the media data, together with metadata including time indicia for each segment in the media data. The processor further receives user input to generate a media content item based on the media data. The user input specifies a start time of the media content item. The processor generates the media content item from the media data, starting with the segment of the media data having a time stamp corresponding to the start time; and stores the media content item.

20 Claims, 4 Drawing Sheets

(56) References Cited

U.S. PATENT DOCUMENTS

| | | | | |
|---|---|---|---|---|
| 7,606,397 B2* | 10/2009 | Kowald | | G06K 9/00221 345/619 |
| 7,702,014 B1* | 4/2010 | Kellock | | G11B 27/034 375/240.01 |
| 7,754,959 B2* | 7/2010 | Herberger | | G10H 1/368 84/601 |
| 7,757,171 B1* | 7/2010 | Wong | | G11B 27/105 345/156 |
| 8,180,826 B2* | 5/2012 | Hua | | G06F 17/30793 709/201 |
| 8,305,463 B2* | 11/2012 | Umezaki | | G11B 27/3027 348/231.2 |
| 8,310,540 B2* | 11/2012 | DeKeyser | | G11B 27/007 348/143 |
| 8,612,517 B1* | 12/2013 | Yadid | | H04N 21/25891 709/201 |
| 8,781,292 B1* | 7/2014 | Ross | | G11B 27/11 386/223 |
| 9,460,205 B2* | 10/2016 | Hughes | | G06F 17/30817 |
| 9,727,790 B1* | 8/2017 | Vaziri | | G06K 9/00771 |
| 9,734,870 B2* | 8/2017 | Sievert | | G11B 27/036 |
| 9,792,502 B2* | 10/2017 | Newman | | G06K 9/00751 |
| 9,805,432 B2* | 10/2017 | Wendel | | G06T 1/0007 |
| 2004/0113933 A1* | 6/2004 | Guler | | G06K 9/00771 715/716 |
| 2004/0156616 A1* | 8/2004 | Strub | | G11B 27/031 386/224 |
| 2005/0078195 A1* | 4/2005 | VanWagner | | H04M 11/04 348/231.3 |
| 2005/0271251 A1* | 12/2005 | Russell | | G06K 9/00288 382/103 |
| 2007/0115373 A1* | 5/2007 | Gallagher | | G06F 17/30265 348/231.3 |
| 2007/0228159 A1* | 10/2007 | Kashiwa | | G06F 17/30247 235/380 |
| 2007/0277108 A1* | 11/2007 | Orgill | | G11B 27/034 715/730 |
| 2008/0055410 A1* | 3/2008 | DeKeyser | | G08B 13/19621 348/143 |
| 2008/0065468 A1* | 3/2008 | Berg | | G06Q 30/02 705/7.32 |
| 2008/0065695 A1* | 3/2008 | Adstedt | | G11B 27/034 |
| 2008/0274798 A1* | 11/2008 | Walker | | G07F 17/32 463/25 |
| 2009/0051768 A1* | 2/2009 | DeKeyser | | H04N 7/18 348/143 |
| 2009/0087161 A1* | 4/2009 | Roberts | | G11B 27/031 386/282 |
| 2009/0240688 A1* | 9/2009 | Ohwa | | G11B 27/105 |
| 2010/0220291 A1* | 9/2010 | Horning | | G02B 27/017 351/210 |
| 2012/0079380 A1* | 3/2012 | Tsai | | G06F 17/30017 715/716 |
| 2012/0179786 A1* | 7/2012 | Nandagopal | | H04L 65/604 709/219 |
| 2012/0263439 A1* | 10/2012 | Lassman | | H04N 5/76 386/280 |
| 2012/0307050 A1* | 12/2012 | Mimar | | G08B 13/19676 348/143 |
| 2013/0121668 A1* | 5/2013 | Meaney | | G11B 27/031 386/282 |
| 2013/0176438 A1* | 7/2013 | Mate | | H04N 7/181 348/157 |
| 2013/0188923 A1* | 7/2013 | Hartley | | H04N 9/87 386/241 |
| 2013/0258089 A1* | 10/2013 | Lyons | | H04N 5/23212 348/77 |
| 2014/0122485 A1* | 5/2014 | Shyamsundar | | G06F 17/30286 707/737 |
| 2014/0176722 A1* | 6/2014 | Sashida | | H04N 5/2259 348/158 |
| 2014/0376876 A1* | 12/2014 | Bentley | | A63F 13/00 386/227 |
| 2015/0086177 A1* | 3/2015 | Williams | | A61B 5/1117 386/228 |
| 2015/0316979 A1* | 11/2015 | Onruang | | H04N 5/77 348/158 |
| 2016/0026240 A1* | 1/2016 | Wexler | | H04N 5/2257 348/207.11 |
| 2016/0026873 A1* | 1/2016 | Wexler | | H04N 5/2257 348/158 |
| 2016/0042767 A1* | 2/2016 | Araya | | G11B 19/02 386/201 |
| 2016/0119515 A1* | 4/2016 | Phillips | | H04N 5/2252 348/158 |
| 2017/0026577 A1* | 1/2017 | You | | G06F 3/167 |
| 2017/0064209 A1* | 3/2017 | Cohen | | H04N 5/23296 |
| 2017/0083087 A1* | 3/2017 | Plummer | | G06K 9/00845 |
| 2017/0125059 A1* | 5/2017 | Zich | | G11B 27/034 |
| 2017/0195563 A1* | 7/2017 | Ribeiro | | H04N 5/23238 |
| 2017/0208312 A1* | 7/2017 | Munger | | H04N 13/0018 |
| 2017/0237897 A1* | 8/2017 | Sivan | | H04N 5/23219 348/47 |

* cited by examiner

NETWORK-BASED EVENT RECORDING

BACKGROUND

Video recordings have become a preferred medium for recording important events in a user's life. In some cases, events, such as weddings, graduations, sporting events, parties, etc., are scheduled and can be anticipated. However, many events happen at unexpected times. For example, a child may say the child's first word or take the child's first step at any time. Often, users fail to capture these moments due to their unplanned and unexpected nature. By the time the user has started to record the event, the most important moment has already passed. A recording device that is worn by the user, and recording continuously, may allow the user to capture these moments.

Including music in the soundtrack of a video recording, and/or including different camera shots from different angles, can greatly increase the effectiveness of the video recording and transform the viewing experience. Currently, however, adding music to a video, or merging two or more videos of a same event, is a time consuming process.

DRAWINGS

FIG. 1 a diagram showing a user wearing a media device.

DETAILED DESCRIPTION

System Overview

Disclosed herein is a system that selects music based on a user's mental state during the recording of the video, and/or merges the video with other video recordings of the same event. The disclosed system can advantageously provide the user with a convenient way to produce a video having a more finished, professional quality than would otherwise be possible.

Figure 1:
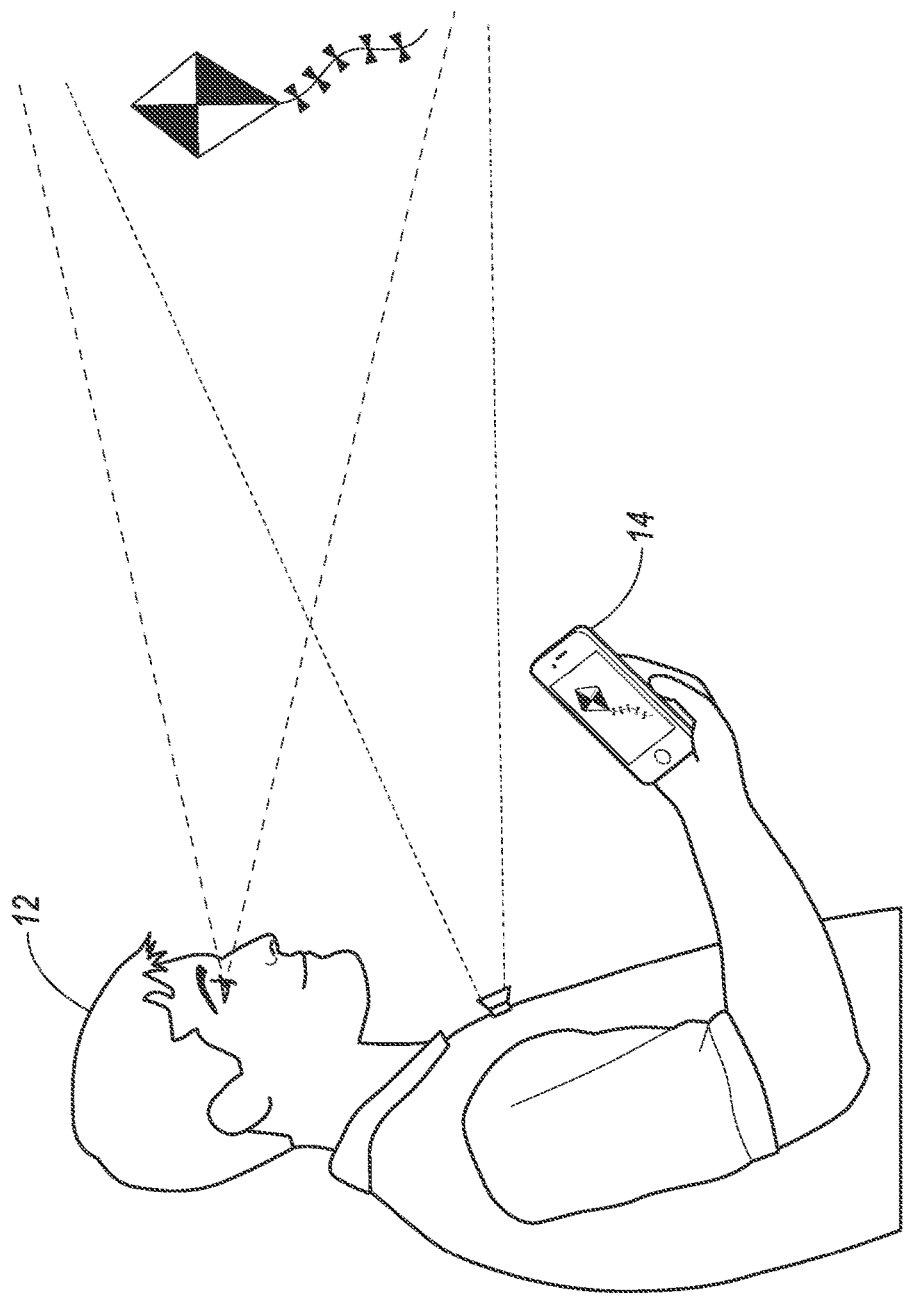

As shown in FIG. 1, a media device 12 is wearable by a user. The media device 12 may be, e.g., mounted on a pin or other small device including a video camera which can be, e.g., attached to clothing of the user and facing forward from the user's chest. The media device 12 includes a processor that is programmed to adjust a field of vision of the camera based on a likely field of vision of the user. The media device 12 is programmed to record media data continuously, and store the video data in a storage buffer. The storage buffer may be capable of storing, e.g., twenty-four hours of video data. The video data, stored in the buffer, enables the user to generate a video recording retrospectively. That is, the user may decide to record an event after the event has started.

Figure 2:
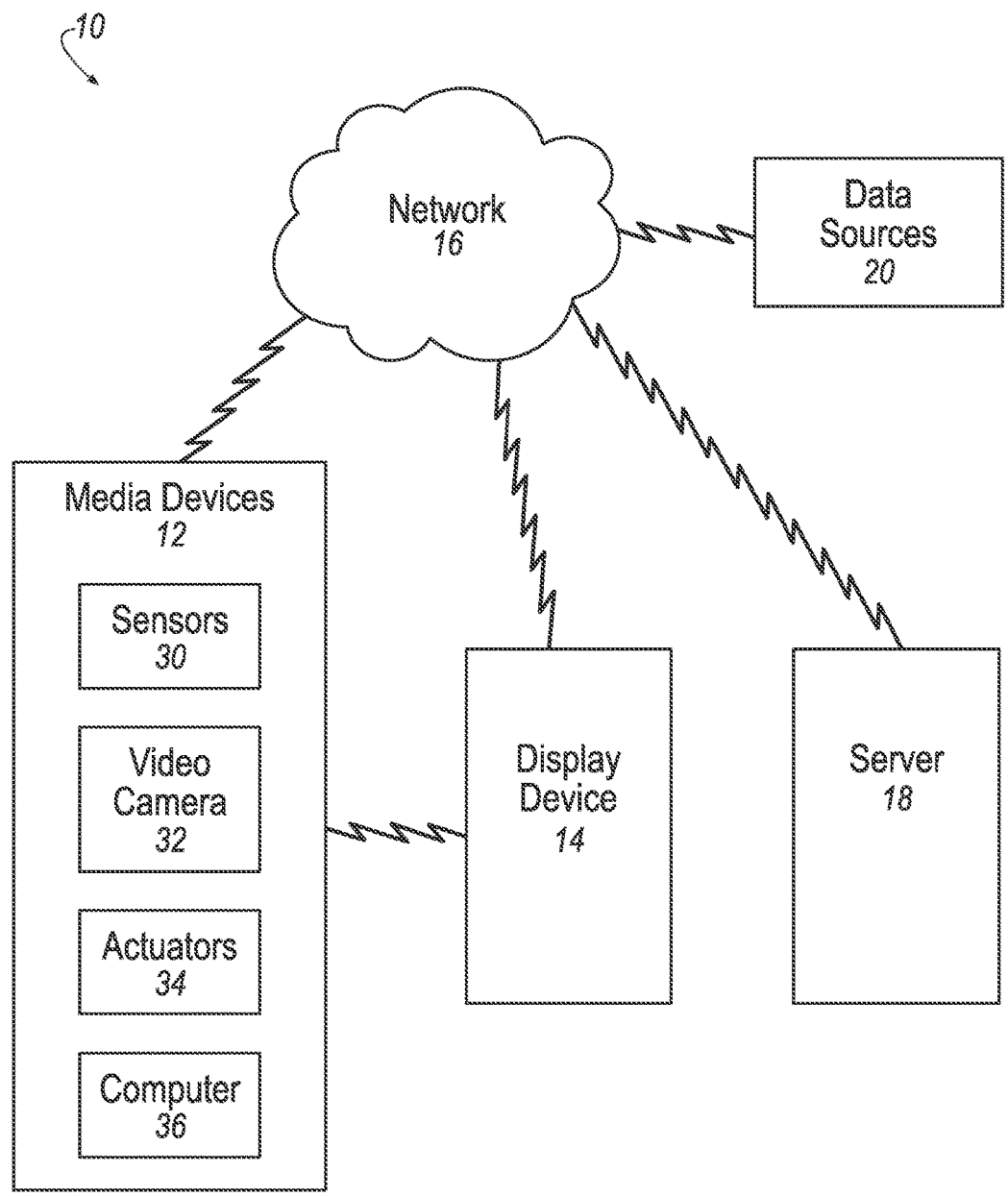
FIG. 2 is a diagram of an exemplary system for capturing an event that has already begun in a video recording.

The media device 12 typically includes sensors 32 (FIG. 2). The sensors 32 may track, e.g., a movement of a chin of the user. Based on the movement of the chin, the media device 12 may adjust the field of vision of the video camera to track the field of vision of the user.

When the user recognizes that an event is taking place that the user would like to record, the user can give a verbal instruction to the media device 12, for example, to generate a primary video recording starting retroactively. For example, the media device 12 may recognize the command "Start recording, back five minutes" or simply, "Record, five minutes" as a command to generate a primary video recording, starting five minutes prior to the current time.

The user of the media device 12 may further specify a duration or end time for the primary video recording. For example, the user may specify a duration of 10 minutes with the command "Start recording, back five minutes, duration 10 minutes", or "Record, five minutes, duration 10 minutes". "Duration 10 minutes" may indicate that the total duration of the primary video recording should be 10 minutes.

An end time may be specified with a command such as "Start recording, back five minutes, end time 10 minutes. "End time 10 minutes" may indicate that the primary recording should continue for 10 minutes beyond the current time.

In a case that the user does not specify the duration, the media device 12 may specify a default duration or end time. For example, the default duration may be 30 minutes. The default end time may be, for example, 10 minutes beyond the current time.

Based on the command, the media device 12 may retrieve the previous five minutes of video data from the buffer and place the video data, e.g., in a separate memory. The primary video recording may be stored together with primary metadata. As described in additional detail below, the primary metadata may include, e.g., the identity of the user, a time stamp indicating a time of the recording, a location of the recording, start and stop indicia, a mental state of the user, etc.

The start command may include a keyword or phrase indicating a mental state of the user. For example, the command may be "Start recording, back five minutes, I am happy," or simply, "Record, five minutes, happy." Based on the command, the media device 12 may, e.g., include the keyword happy in the primary metadata associated with the primary video recording. As described below, the mental state keyword may be used by a computing device to select music to include in a soundtrack for the secondary video recording.

The media device 12 is typically programmed to continue recording the event, and to and generate the primary video recording until receiving a stop command, until a specified recording duration or end time is reached, or until a default duration or end time is reached. For example, the media device 12 can receive a stop command from the user. The stop command may be a simple verbal command such as "Stop recording."

In the case that no stop command is received, the media device 12 will continue recording until either, the user specified recording duration or end time (when available) is reached, or until the default recording duration or end time is reached.

The media device 12 may, when the primary video recording is finished, or at another time, upload the primary video recording to a server 18 (FIG. 2). The server 18 may store the primary video recording, together with the primary metadata. Additionally, the server 18 may, for example, generate a secondary video recording based on the primary video recording. For example, the server 18 may select music from a music library based on the mental state keyword included in the primary metadata, and add the music to the soundtrack of the primary video recording to create the secondary video recording.

Further, the server 18 may be programmed to receive, from a plurality of video devices, other primary video recordings of the same event. Based on metadata identifying the users who generated the other primary video recordings of the same event and/or other identifying metadata, the server 18 may determine that the other users are "friends" of the user. Based on identifying the other users as friends, the server 18 may merge at least portions of the other video recordings with the primary video recording to generate the secondary video recording.

The server 18 may still further perform other media processing operations, such as adjusting a length of the video recording to the length of the music, adding additional music to accommodate a primary video recording that is longer than a selected song, etc.

The server 18 may further post the primary video recording and/or the secondary video recording on one or more social networks.

As described in additional detail below, the music library can be a library of popular music. The server 18 may select music that corresponds to the user's mental state from the library, and include the music in the secondary video recording. The server 18 may further be programmed to determine whether the song is included in a personal library of the user. In the case that the song is not in the user's personal library, or that the user is required to purchase additional rights to use the song in the secondary video recording, the server 18 may provide a link to the user to purchase rights to the song.

The server 18 further can store together with the secondary video recording, a link for viewers of the secondary video recording to purchase rights to the song. In this manner, a viewer, who likes the song, can purchase rights to include the song in the viewer's library.

Exemplary System Elements

Referring now to FIG. 2, the media processing system 10 includes one or more media devices 12, one or more display devices 14, a network 16 and a server 18. The media processing system may further include one or more data sources 20.

The media device 12 may be, for example a wearable device including an attachment mechanism such as a pin, clip, or other device having mounted thereon or including a video camera. Via the attachment mechanism, the media device 12 can be attached to clothing of the user, and worn, e.g., on the chest of the user. The media device 12 may further be a wearable device such as a pair of glasses, or a contact lens that is worn by the user and includes a video camera. The media device 12 may be included in a single housing, or may include an optical element that is remote from, and communicatively coupled, for example via fiber optics, to the single housing.

As further shown in FIG. 2, media device 12 includes sensors 30, a video camera 32, actuators 34 and a computer 36. Each of the sensors 30, video camera 32 and actuators 34 can include processors and memories in a known manner, and are communicatively coupled to the computer 36, e.g., in a known manner using wired or wireless communications. The media device 12 generally records, and stores in a buffer, visual and audio data (collectively video data) from the user's surroundings. Upon receiving commands from the user, the media device 12 is additionally programmed to generate a primary video recording, which may start retroactively to a current time.

The sensors 30 are programmed to provide data to the computer 36 related to movements of the user, and may additionally by used to receive commands from the user.

The sensors 30 may include, for example, infrared sensors, ultrasonic sensors, depth sensors, accelerometers, gyroscopes, optical sensors, etc., which may be used to track movements of the user. In a case that, e.g., the media device 12 is worn on the chest of the user, the sensors 30 may track a position of the chin of the user relative to the torso of the user, and provide the data to the computer 36. The computer 36 may use the chin position data as an indication of the field of view of the user.

The sensors 30 may further include a microphone for receiving commands from the user.

In a case that the media device 12 is included in a pair of glasses worn by the user, the sensors may be optical sensors which detect the position of the eyes (e.g., the direction the iris or pupil of the eye is facing) of the user and provide the data to the computer 36. In this case, the computer 36 may use the eye position data as an indication of the field of view of the user.

The media device 12 includes a video camera 32, such as is known. The video camera 32 may receive visual and audio data (collectively video data), and provide the video data to the computer 36. The video camera 32 includes an optical element such as a lens for collecting visual data from a field of vision. The field of vision may be adjusted, for example, by adjusting a direction of the optical element (e.g., a direction of the center of the field of vision as it extends away from the media device 12) relative to the media device 12, and/or adjusting a focal length of the optical element. The computer 36 may, for example, adjust the direction of the lens by sending an instruction to an actuator 34. The actuator 34 may change an angle of the lens relative to the media device 12. The angle may be adjusted, e.g., in two dimensions. A first dimension may be lateral (left, right) with regard to the media device 12, and the second dimension may be vertical (up, down) with regard to the media device 12.

The actuators 34 may be one or more motors, one or more solenoids, one or more MEMS (microelectromechanical systems), etc., which may, based on instructions and/or electrical signals, displace or otherwise move an optical element or portion of the optical element of the video camera 32.

The computer 36 is programmed to receive data and instructions from and to send data and instructions to the sensors 30, video camera 32 and actuators 34. For example, the computer 36 may receive data indicating a change in the field of vision of the user. Based on the data, the computer 36 may send instructions to one or more actuators 34 to adjust a field of vision of the video camera 32 optical element.

The computer 36 is further programmed to receive video data from the video camera 32 and store the data. When the video camera 32 is activated, the computer 36 may receive video data continuously from the video camera 32, and store the data in a storage buffer. The storage buffer may, e.g., have a capacity sufficient to store twenty-four hours of video data. The computer 36 stores data in the buffer such that the most recently recorded twenty-four hours of data is available in the buffer.

The computer 36 is further programmed, based on instructions received from a user, to generate one or more primary video recordings from the video data. As described in additional detail below, the primary video recordings may have a specific start time and specific duration or end time, specified by the user, and continue until: 1) a stop command is received from the user, 2) the duration or end time specified by the user is reached, or 3) a default duration or end time is reached.

Additionally, the computer 36 is programmed for wired and/or wireless communications with the display device 14 and the server 18. Communications with the display device 14 and the server 18 may be via one or more wired or wireless connections such as a Universal Serial Bus (USB), high-definition multimedia interfaces (HDMI), Bluetooth, cellular communications, satellite communications, WiFi communications, etc., as are known.

The display device 14 is programmed to receive media content (such as the buffered video) and display the media content to a user and may be, for example a computing device such as a mobile telephone, tablet or laptop computer, etc. The display device 14 may receive media content from the media device 12, and may further receive media content from the server 18, e.g., via the network 16. The display device 14 may be programmed for wired and wireless communications such as Universal Serial Bus (USB), high-definition multimedia interfaces (HDMI), Bluetooth, cellular communications, satellite communications, WiFi Communications, etc., as are known.

The network 16 represents one or more mechanisms for delivering media content between the media devices 12, the display devices 14, the server 18, and the data sources 20. Accordingly, the network 16 may comprise one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) such as a WiFi network or Ethernet, and/or wide area networks (WAN), such as the Internet, etc.

Media content, such as the primary video recording generated by the media device 12 and secondary video recording generated by the server 18, is generally delivered via the network 16 in a digital format, e.g., as compressed audio and/or video data, and may include media data and metadata. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided in a format such as the MPEG-1, MPEG-2, or the H.264/MPEG-4 Advanced Video Coding standards (AVC) (H.264 and MPEG-4 at present being consistent), or according to some other standard or standards. For example, media content could be audio data formatted according to standards such as MPEG-2 Audio Layer III (MP3), Advanced Audio Coding (AAC), etc. Further, the foregoing standards generally provide for including metadata.

The server 18 is a computing device including a processor and memory. The server 18 is typically programmed to receive primary video recordings from one or more media devices 12. As discussed in additional detail below, the server 18 may be programmed to perform media processing functions such as mixing and adding audio soundtracks to generate a secondary video recording. The server 18 may be programmed, based on primary metadata associated with one or more of the primary video recordings, to merge one or more primary video recordings to generate a secondary video recording, and to select a song or songs to include in an audio track for the secondary video recording.

The server 18 may select the song or songs from, e.g., a third-party media provider. The server 18 may further be programmed to provide a link to the user to permit the user to purchase rights to the song or songs for use in the secondary video recording. Still further, the server 18 may be programmed to provide a link together with the secondary video recording, such that viewers of the secondary video recording may purchase the song or songs for their personal music libraries.

Data sources 20 are typically computer servers accessible via the network 16. The data may include time data, location data, and media content such as songs. For example, a first data source 20 may transmit a signal indicating a current time, e.g., synchronized with an atomic clock. A second data source 20 may be a global positioning system which may provide latitude and longitude data related to a user's (or the user's media device 12) position. A third data source 20 may be a database such as is known to store one or more libraries of songs and to make the libraries available to the server 18 via the network 16. The data sources 20 may provide a license to include the songs in a soundtrack of a video recording, for example, on a fee basis.

Based on the data received from the data sources 20, the media device 12 and/or the server 18 to, e.g., generate time stamps for the first and secondary video recordings, determine a location of one or more media devices recording an event, select a song or songs to include in a secondary video recording, etc.

Processes

Capturing Video Data and Storing the Video Data in a Storage Buffer

The media device 12 computer 36 is programmed to, when activated, to capture video data (visual and audio) from an environment of the user, on an on-going, continuous basis. For example, the user may, attach the media device 12 to the user's clothing, e.g., on the user's chest, such that the video camera 32 in the media device 12 is generally facing forward. The field of vision of the optical element in the video camera 32 may extend, in an initial position, from the media device 12 in a direction perpendicular to the chest of the user.

User input to begin recording can be received in one or more known ways, via, e.g., an on/off button, or a verbal command such as "On" according to know speech recognition techniques. On receiving such user input, the device 12 starts to record video data and store the video data to buffer storage.

Buffer storage may be electronic data storage with a capacity sufficient for twenty-four hours of video data. The computer 36 may, as is known, store video data in the storage buffer such that the most recent twenty-four hours of video data are available. The video data may be stored as a sequence of segments. Each segment of video data may include a predetermined portion of the video data, for example, a 10 second portion of the video data.

In addition to storing the video data, the computer 36 may generate metadata and associate the metadata with the video data. The metadata may include recording level metadata (related to the complete recording), and may include data describing characteristics of the video data such as a location where the video data was recorded, an identification of the media device 12 and/or the user of the media device 12, a time when the video data was recorded, etc. Additionally or alternatively, the metadata may include segment level metadata, and may indicate, for example, a starting time and an end time of the segment of video data. The metadata may further include, for example, beginning and end indicia, indicating, e.g., a location of a first frame of the segment and a last frame of the segment in the storage buffer.

The computer 36 may continue this process until the user turns off the media device 12. The user may turn off the media device 12 via, e.g., an on/off button, or a verbal command such as "Off."

Adjusting the Camera Field of Vision Based on User Movements

As discussed above, to adjust the field of vision of the video camera 32, the media device 12 computer 36 may be programmed to receive data indicating a position of a first portion of the user's body relative to a position of the media device 12. Based on the data, the computer 36 may be programmed to adjust the field of vision of the video camera 32. In this manner, the computer 36 may adjust the field of vision of the video camera 32 to more closely correspond to the field of vision of the user.

For example, referring back to FIG. 1, the media device 12 could be attached to a user's chest (i.e., to a garment being worn by the user), such that, in an initial position, the field of vision of the video camera 32 extends in a direction perpendicular to the user's chest. The media device 12 may include one or more sensors 30 that are arranged to track to movement of the chin of the user. In the case that the chin of the user moves to the left (rotates counterclockwise) relative to the chest of the user, the computer 36 may instruct one or more actuators 34 to change an angle of the field of vision of the video camera 32, such that the field of vision also rotates to the left (counterclockwise) relative to the chest of the user. Similarly, if the chin of the user moves out and up (i.e., the user tilts his head back), the computer 36 may instruct one or more actuators 34 to change an angle of the field of vision of the video camera 32, such that the field of vision also rotates up, i.e., extends at an angle upward from the chest of the user.

In this manner, the computer 36 can adjust the angle of the field of vision of the video camera 32 such that it more closely matches the angle of the head of the user. Since, in a typical case, the user's field of vision tracks, at least to some extent, the position of the user's head, adjusting the field of vision of the video camera 32 to track the user's head may increase a correspondence between the field of vision of the video camera 32 and the field of vision of the user.

As another example, the media device 12, or the optical element of the video camera 32 included in the media device 12, may be mounted, for example, in the user's glasses. In this case, for example, sensors 30 mounted in the user's glasses may track the position of the user's eyes (e.g., direction of pointing of the iris or pupil). The computer 36 may receive data from the sensors 30 indicating an angle of the user's eye relative to the user's head. Based on the sensor data, the computer 36 may adjust an angle of the optical element of the video camera 32 relative to the user's glasses such that the field of vision of the optical element more closely corresponds to the field of vision of the user's eyes.

As yet another example, the optical element of the video camera 32 may be embedded in a contact lens attached to an eye of the user. In this case, it may not be necessary to adjust an angle of the field of vision.

Generating the Primary Video Recording Based on User Commands

As discussed above, the media device 12 computer 36 may be programmed to generate a primary video recording based on commands from the user. The primary video recording may include video data previously recorded by the media device 12 and stored in the storage buffer. The user may, for example, command the media device 12 to record an event, and include the previous five minutes of video data in the recording.

The user may, e.g., issue a verbal command such as "Record, back five minutes" or Record, five minutes". Based on the command, the computer 36 may retrieve the last five minutes of video data from the storage buffer, and, for example, transfer the video data to a second storage for a primary video recording. The computer 36 may additionally generate primary metadata identifying various characteristics of the video such as time and/or place of the recording, for example, the start time of the primary video recording, a location of the primary video recording, the identity of the user, etc.

This may be useful when a user determines, in the middle of an event, that the user would like a primary video recording of the event. For example, the user may be mountain biking with a friend. The friend may be riding in front of the user. The user may witness her friend navigate difficult terrain, and may wish to generate a primary video recording of the ride. By making use of the video data in the storage buffer, the user can choose a starting time for the primary video recording retroactively.

The user may further specify, via the verbal command, the duration or end time of the primary video recording. For example, the verbal command "Record, back five minutes, duration 10 minutes" may specify that the start time for the primary video recording is five minutes prior to a current time, and that the media device 12 should stop recording when the primary video recording reaches a duration of 10 minutes. As another example, the verbal command "Record, back five minutes, end time 10 minutes" may specify that the start time for the primary video recording is five minutes prior to the current time, and that the media device 12 should stop recording at an end time 10 minutes after the current time.

In some cases, the user may issue a verbal command to stop a primary video recording. For example, the user may issue a command to "Stop recording" or simply to "Stop". The media device 12 may be programmed, upon receiving such a command, to stop the primary video recording. Additionally, as described above, the media device 12 may be programmed, in the absence of instructions from the user, to apply a default duration or end time to the recording of the primary video recording.

Upon receiving the stop recording command, reaching the specified duration or end time, or reaching the default duration or end time, the media device 12 may stop generating the primary video recording. The media device 12 may, however, continue to capture and store video data in the storage buffer. In some cases, the user may wish to select a starting time and/or an end time for the primary video recording based on the captured data. For example, the user may witness a comical event and wish to generate a primary video recording that starts just before the comical event. The user may instruct, via a user interface or verbal command, the media device 12 to display a specified portion of the video, e.g., the last five minutes of video data on the display device 14. The user may view the last five minutes of data, and select, for example via a user interface, the starting time of the primary video recording.

In a similar manner, the user may further view the previously stored data, and select, via the user interface, the end time of the primary video recording.

Receiving and Associating User Mental State Data with the Primary Video Recording The computer 36 may be programmed to receive user mental state data from the user, and include the user mental state data in metadata associated with a primary video recording. The computer 36 may be programmed, e.g., to recognize ten different keywords representing common mental states such as "happy," "sad," "laughing," "thrilled," etc. The available keywords may be made available to the user via, for example, a user manual, or a media device tutorial.

When the user initiates the generation of a primary video recording, the user may, in addition to indicating a start time, indicate a mental state. For example, the user may issue a command such as "Record, back ten minutes, I am happy", or more simply "Record, ten minutes, happy". The computer 36 may include the keyword "happy" in the metadata associated with the primary video recording. As described below, a computing device such as the server 18 may use the keyword data to select appropriate music to include in a soundtrack for generating a second (produced) video recording from the primary video recording.

Uploading the Primary Video Recording to the Server

Based on a trigger event, the media device 12 computer 36 may upload the primary video recording to the server 18. A trigger event may be, for example, when the computer 36 has completed the primary video recording. Additionally or alternatively, a trigger event may be, e.g., receiving a request from the server 18, receiving an upload instruction from the user, the occurrence of a periodic upload time (e.g., 20:00 each evening), etc.

Upon identifying the trigger event, the computer 32 may transmit, for example via the network 16, the primary video recording, together with the associated primary metadata to the server 18.

Generating the Secondary Video Recording from One or More Primary Video Recordings The server 18 may generate a secondary video recording from one or more received primary video recordings. The secondary video recording may include features such as a music soundtrack and, when available, camera shots from multiple media devices 12.

Selecting and Adding a Music Soundtrack

Initially, the server 18 may select music to include in a soundtrack for the secondary video recording, based on the mental state keyword in the primary metadata. For example, the server 18 may detect the keyword "happy" in the primary metadata. Based on the keyword, the server 18 may search through a popular music library for a song that is identified as a happy song, or a song appropriate as a soundtrack for a happy video.

The popular music library may be, for example, a music library provided by a third-party, which includes songs that are available for use with video recordings. The popular music library may further, for example, provide a set of keywords associated with each song. The song keywords may be arranged to correspond with mental state keywords, e.g., the ten mental state keywords available to the user to describe the user's mental state, as described above.

In addition to providing song keywords, the popular music library may provide, for example, a ranking of songs, based on current popularity. Current popularity may be determined, based on, for example the number of downloads (or purchases) of the song in the previous week, the number of times someone has listened to the song on one or more websites in the previous week, etc.

The server 18 may select, as a candidate to include in the secondary video recording, a song that is the most popular song having a song keyword that matches the user mental state keyword.

After selecting the song, the server 18 may further obtain information from various data sources, e.g., the server 18 could include programming to search a data store comprising a personal music library of the user to determine if the user owns rights to use the selected song in the secondary video recording. In the case that the user does not have rights to use the song, the server 18 may select, for example, a second most popular song having a song keyword matching the mental state keyword, and determine whether the song is in the user library data store. The server 18 continues in this manner until the server 18 identifies a song included in the user library data store. In a case that the server 18 does not find a song in the user library data store, the server 18 may simply select the most popular song having a corresponding keyword for use in generating the secondary video recording.

After selecting the song, the server 18 may, e.g., generate the secondary video recording by overlaying the song with the soundtrack of the primary video recording. In the case that the song was not included in the user library data store, the server 18 may provide the user a link, e.g., via e-mail or text message, to purchase the right to use the song in the secondary video recording.

Merging Multiple Primary Video Recordings

In some cases, two or more users may generate primary video recordings of the same event. For example, both a mother and father may be watching their child when the child walks for the first time. The server 18 may recognize, for example, based on the primary metadata associated respectively with the primary video recordings, that the primary video recordings are associated with the same event. The server 18 may further determine, based on the primary metadata, for example, that the users that generated each of the respective primary video recordings are registered as friends within an application for generating secondary video recordings.

Based upon this determination, the server 18 may inquire of the two or more users, whether the users would like the server 18 to merge the primary video recordings. In the case that the users agree, the server 18 may generate a merged secondary video recording from the two or more primary video recordings.

The server 18 may, e.g., merge the two or more primary video recordings by alternating segments of each according to a predetermined amount of elapsed time, e.g., alternating segments of five to ten seconds each. The segments may be chronological and time-synched, such that the merged secondary video recording has the appearance of a standard TV show or movie.

Matching the Length of the Visual Content to the Music Soundtrack

The server 18 may be programmed to generate the secondary video recording such that the length of the visual content is approximately the same as the length of the song selected for the secondary video recording. Approximately the same length may be defined, for example, as the length of the visual content being within +/−15 seconds of the length of the song. The server 18 may implement, based on circumstances and/or based on input from the user, one or more methods for matching the length of the visual content to the length of the audio soundtrack.

As a first example, the server 18 may select, based on primary metadata from a primary video recording, a song to include in a soundtrack. The song may be, however, longer than the primary video recording. The server 18 may, in this case, wait until the server 18 has received additional primary video recordings from the user, that taken together, are approximately as long as the song.

As a second example, in a case that the primary video recording is longer than the song, the server 18 may include one or more additional songs such that the total length of the songs is approximately equal to the length of the primary video recording.

As a third example, in a case that the primary video recording is too long for a selected song, the server 18 may be programmed to uniformly select portions of the primary video recording to be removed when generating the secondary video recording. Prior to removing the segments, user input may be received indicating via a user interface segments of the primary video recording that are important and may not be removed.

The examples above may also be combined. As a fourth example, the server 18 may accumulate three primary video recordings that together, are somewhat longer than a selected song. The sever 18 may combine the three primary video recordings, and then uniformly remove segments, such that the total (adjusted) length of the first three video recordings is approximately equal to the length of the song.

Finally, in some cases, the user may elect that the secondary video recording be generated from the primary video recording and the selected song, without any adjustment. In the secondary video recording, the song may end before the video content, or vice versa.

The above list of example methods for matching the length of the visual content to the length of the audio soundtrack in the secondary video recording is non-limiting. Other methods may be used.

User Account/Uploading Media Content to Social Networks/Providing Links to Purchase Songs The server 18 may store the first and secondary video recordings and associate the first and secondary video recordings with a user account. Based on the stored data, the server 18 may generate a user interface that the user can use to access the stored media content. The user interface may list the stored media content chronologically, according to event, according to emotion, according to location, etc. Via the user interface, the user may select primary and/or secondary video recordings to upload to social networks, email to friends, etc. The server 18 may further be programmed to automatically upload, for example, completed secondary video recordings, to selected social networks.

The server 18 may additionally provide, together with the primary and secondary video recordings, the title of the song or songs used in the soundtrack, and a link to purchase, one or more of the songs, e.g., for inclusion in a user library data store.

Exemplary Process Flows

Figure 3:
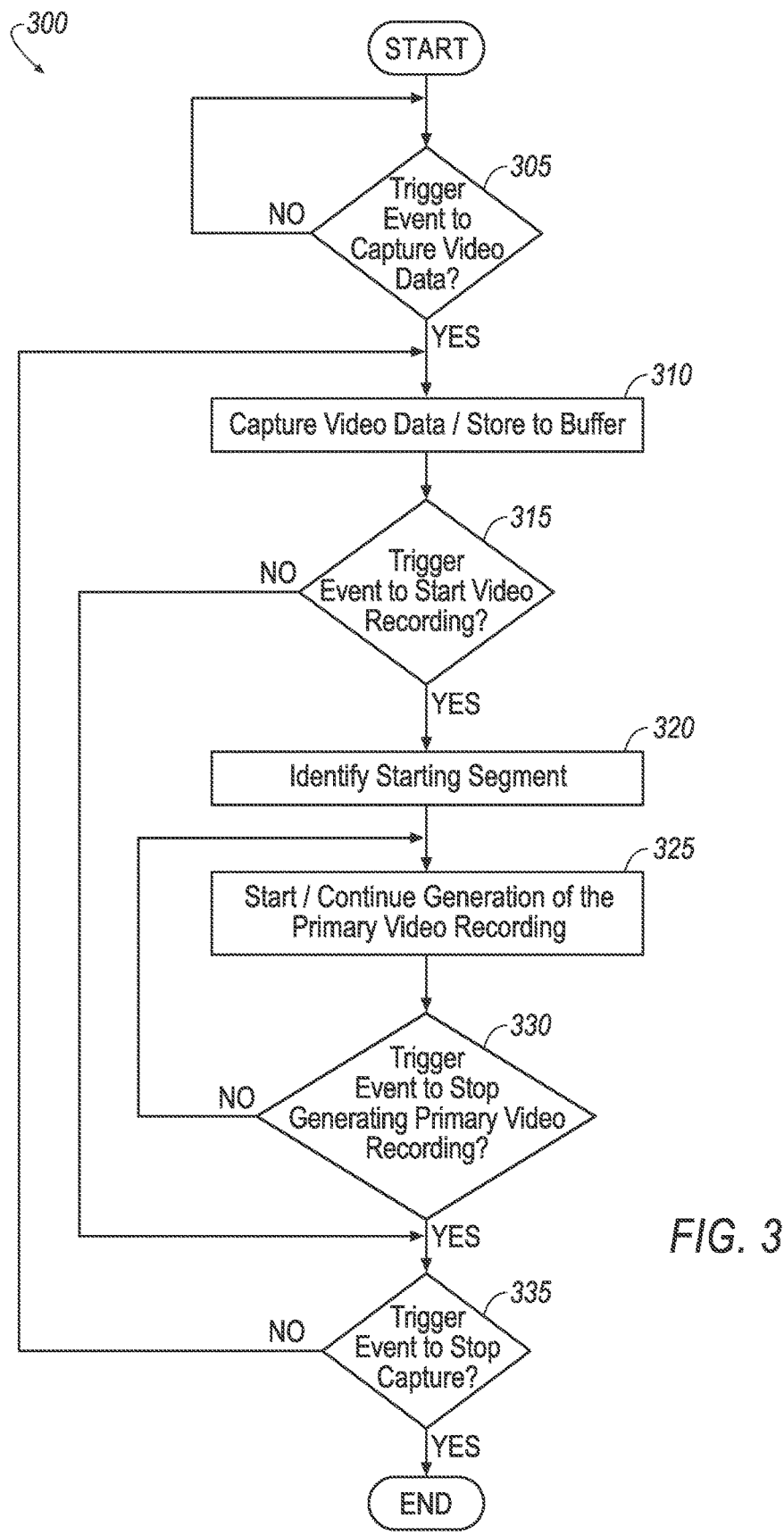
FIG. 3 is a diagram of an exemplary process for capturing an event in a primary video recording.

FIG. 3 is a diagram of an exemplary process 300 for capturing, by the media device 12, an event in a primary video recording. The process 300 starts in a block 305.

In the block 305, the media device 12 computer 36 determines the presence or occurrence of a trigger event to begin capturing video data. For example, the computer 36 may receive an input from a switch indicating that the media device 12 should capture video data. As another example, the media device 12 may receive a verbal command, interpreted according to known speech recognition techniques, such as "On" or "Capture," indicating that the media device 12 should begin to capture and store video data. In the case that the computer 36 recognizes a trigger event, the process 300 continues in a block 310. In the case that no trigger event is detected, the process 300 continues in the block 305.

In the block 310, the media device 12 computer 36 collects video data (visual and audio) and stores the data, together with metadata in a media data storage buffer. The media data may be stored as segments of a predetermined length (for example, frames representing ten seconds of media data). As described above, the metadata may include data describing characteristics of the video data such as a location where the video data was recorded, an identification of the media device 12 and/or the user of the media device 12, a time when the video data was recorded, etc. Some or all of the metadata may be segment level metadata, and may indicate, for example, a starting time and an end time of the segment of video data. After starting the video data capture process, the process 300 may continue in a block 315. The capture process may continue on an on-going basis.

In the block 315, the computer 36 determines the occurrence of a trigger event to start the generation of a primary video recording. The trigger event may be an input from the user via an interface (a switch, button, button on a touch screen, etc.) indicating that the computer 36 should start to generate a primary video recording. Alternatively, the trigger event may be a verbal command received from the user. As described above, the verbal command may indicate that the computer 36 should start the generation of the primary video recording. The verbal command may specify a start time for the primary video recording which may be before a current time. The verbal command may additionally specify a primary video recording duration, and a user mental state. Upon determining the occurrence of a trigger event by the computer 36, the process 300 continues in a block 320. In the case that no trigger event is detected, the process 300 continues in the block 315.

In the block 320, the computer 36 identifies a segment of the video data stored in the storage buffer, to use as the starting segment of the primary video recording. In the case that the trigger event was an activation of a switch, the computer 36 may select the segment that was captured at a time of receiving the switch input, i.e., approximately the current time. Approximately the current time may be defined as, e.g., within 200 milliseconds of the activation of the switch.

Alternatively, as described above, the user may instruct the computer 36 to start the primary video recording retroactively. For example, the user may instruct to the computer 36 to start the primary video recording five minutes prior to a current time. In this case, the computer 36 may calculate a start time five minutes prior to the current time. The computer 36 may then identify a segment of video data in the buffer storage with a time stamp corresponding to the calculated start time. The computer 36 may select this segment as the first segment of the primary video recording.

As another alternative, and as described above, the user may display, via the display device 14, video data stored in the storage buffer, and select, via a user interface, a first segment of the primary video recording. Upon selecting the first segment for the primary video recording, the process 300 continues in a block 325.

In the block 325, computer 36 starts or continues to generate the primary video recording. Starting with the first segment of the primary video recording, identified in the block 320, and including subsequent segments of media data, the computer 36 generates the primary video recording, as is known.

The primary video recording includes and/or is associated with primary metadata. As described above, the primary metadata may include recording level metadata (related to the complete recording), and may further include segment level metadata describing a segment of the primary video recording. The primary metadata may include data such as a time stamp, a location of the recording, an identity of the user or the media device used to record the media data, start and end indicia for each segment, etc. As described in detail above, the metadata may also include a mental state keyword describing a mental state of the user. Upon generating, for example, up to a current time, the primary video recording, the process 300 continues in a block 330.

In the block 330, the computer 36 may determine whether the computer 36 should continue recording. For example, the computer 36 may determine whether a trigger event to stop generating the primary video recording has occurred. The trigger event to stop recording may be, for example, a switch or button input from the user indicating that the user would like to discontinue recording. The trigger event may further be a verbal command from the user indicating that the user would like to stop generating the primary video recording. The trigger event may further be that the duration or end time of the primary video recording has reached a user specified duration or end time, or default duration or end time for the primary video recording. Upon determining that a trigger event to stop generating the primary video recording has occurred, the process 300 continues in a block 335. Otherwise, the process 300 continues in the block 325.

In the block 335, the computer 36 determines whether a trigger event to stop capturing video data has occurred. For example, a trigger event to stop capturing data may be a switch or button input from the user interface, or a verbal command from the user. In the case that the computer 36 determines that a trigger event to stop capturing video data has not occurred, the process continues in the block 310. In the case that the computer 36 determines that the trigger event has occurred, the process 300 ends.

Figure 4:
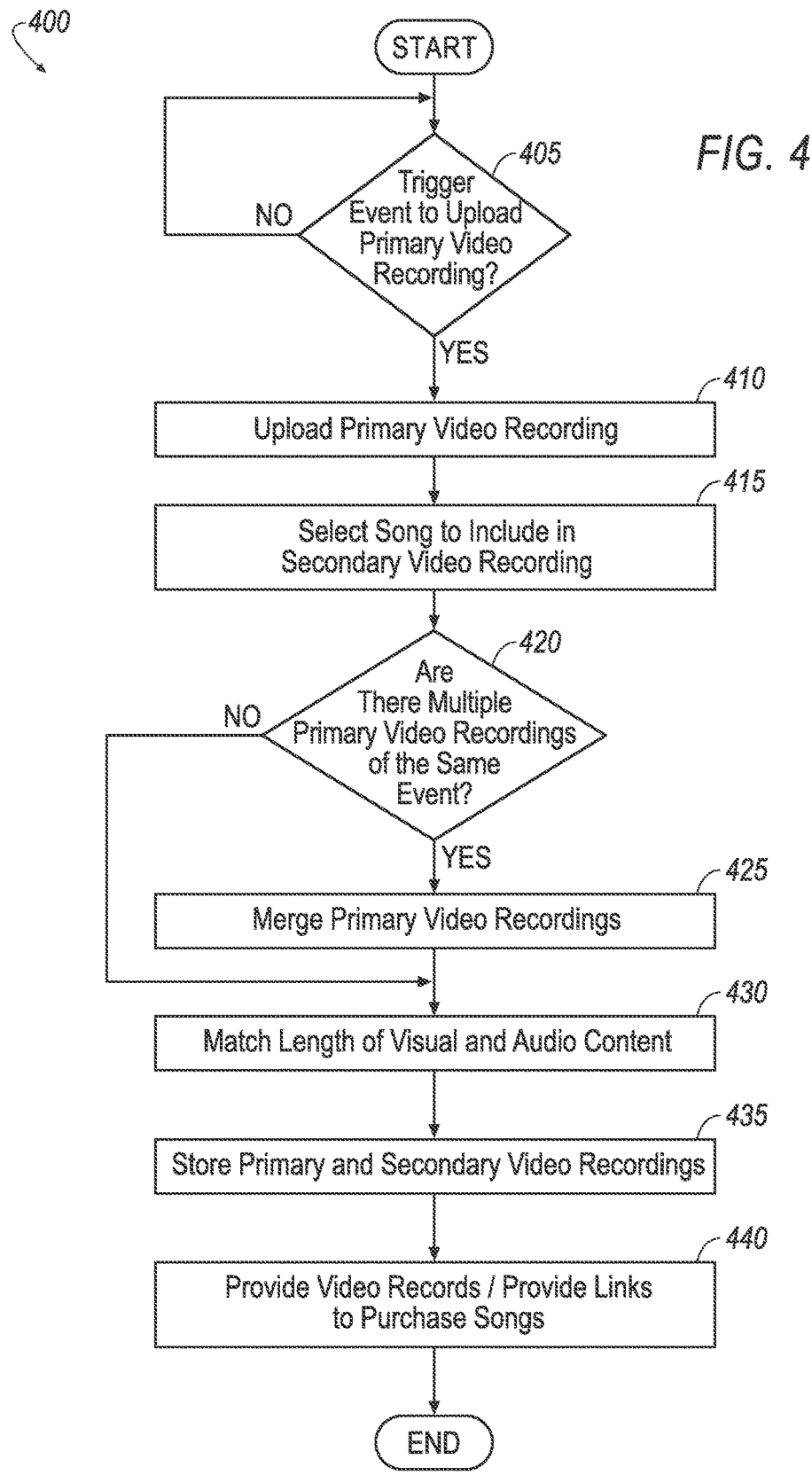
FIG. 4 is a diagram of an exemplary process for generating a secondary video recording of an event including music and/or content from one or more primary video recordings of the event.

FIG. 4 is a diagram of an exemplary process 400 for generating a secondary video recording of a recording event that may include merging media content from two or more primary video recordings of an event, and may further include adding a music track based on mental state data of the user. The process 400 starts in a block 405.

In the block 405 the server 18 and/or media device 12 determine that a trigger event has occurred to upload a primary video recording to the server 18. For example, the media device 12 may recognize completing the primary video recording as a trigger event to upload the primary video recording to the server 18. Alternatively or additionally, the media device may recognize an input from the user, or a scheduled time as a trigger to upload the primary video recording to the server 18.

In other cases, the server 18 may determine a trigger event has occurred to upload primary video recordings from the media device 12. For example, the server 18 may recognize a scheduled time (e.g., 20:00 each day) as a trigger event to upload the primary video recording. Based on determining the trigger event has occurred, the server 18 may send a request to the media device 12 to upload any completed primary video recordings. Still further, the server 18 may receive a user input, e.g., via an interface provided by the server 18, indicating that the server 18 should collect primary video recordings from the media device 12. Upon determining that a trigger to upload the primary video recording has occurred, the process 400 continues in a block 410. In the case that no trigger is detected, the process 400 continues in the block 405

In the block 410, the server 18 uploads, from the media device 12, the primary video recording. Upon uploading the primary video recording, the process 400 continues in a block 415.

In the block 415, the server 18 selects one or more songs to include in a soundtrack for the secondary video recording, as described above. The server 18 further, via media processing techniques as are known, adds or overlays the song with the soundtrack of the primary video recording, as a step in generating the secondary video recording. Upon selecting the song or songs, and including the song or songs in the secondary video recording, the process 400 continues in a block 420.

In the block 420, the server 18 determines whether there are other primary video recordings related to the same recording event. In the case that two or more primary video recordings are available from the same event, the server 18 may further determine whether the users who generated the two or more of the primary video recordings are friends. Based on this determination, the server 18 may ask the two or more users whether the server 18 should merge the two or more primary video recordings into the secondary video recording. In the case that the server 18 determines, that the server 18 should include media content from two or more primary video recordings in the secondary video recording, the process 400 continues in a block 425. In the case that the server 18 determines that no other related primary video records are available, or that the users do not want the primary video recordings to be merged, the process 400 continues in a block 430.

In the block 425 the server 18 merges, as described above, the two or more primary video recordings as a step in generating the secondary video recording. The process 400 continues in a block 430.

In the block 430, the server 18 matches the length of the video content in the secondary video recording to the length of the song of songs of the secondary video recording, as described above. The process 400 continues in a block 435.

In the block 435, the server 18 stores the primary and/or secondary video recordings, e.g., in a memory associated with the server 18, and associates the stored video recordings with a user account. The server 18 may further provide a user interface to the user, via for example the media device 12 or the display device 14. The user interface may list the stored media content chronologically, according to event, according to emotion, according to location, etc. Via the user interface, the user may download primary and/or secondary video recordings to a local device such as the media device 12 or the display device 14. The user may manually edit and re-upload the primary and/or secondary recording to the server 18.

Additionally, the user may use the user interface to select primary and/or secondary video recordings to upload to social networks, email to friends, etc. The server 18 may further be programmed to automatically upload, for example, completed secondary video recordings, to selected social networks. The process continues in a block 440.

In the block 440, the server 18 provides data related to the song or songs, such as title and author, to viewers of the secondary video recording. The data may be provided, for example, in an interface used to display the secondary video recording.

In addition to providing the data related to the one or more songs, the server 18 may provide, e.g. via the interface used to display the secondary video recording, a link that allows the viewer to purchase rights to include the one or more songs in, e.g., the viewers personal music library. Upon providing access to the secondary video recordings and links to purchase the songs by the viewers, the process 400 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
a media device worn on a chest of a user, the media device including a processor and a memory, the memory storing instructions executable by the processor such that the processor is programmed to:
receive, from a sensor included in the media device, sensor data indicating a field of view of a user of the media device, wherein the data includes a position of a chin of the user relative to a position of the media device worn on the chest of the user;
adjust a field of view of a video capture device in the media device to correspond to the field of view of the user;
receive, from the video capture device, media data;
store the media data, together with metadata including time indices for each of one or more segments in the media data;
receive user input to generate a primary media content item based on the media data, the user input specifying a start time of the primary media content item;
generate the primary media content item from the media data, starting with the segment of the media data having a time index corresponding to the start time; and
store the primary media content item.

2. The system of claim 1, wherein the data includes a position of an eye of the user.

3. The system of claim 1, wherein the media device is one of:
worn by the user; and
attached to clothing worn by the user.

4. The system of claim 1, wherein the user input includes data specifying a mental state of the user, and the processor is further programmed to:
include the user mental state data in primary metadata associated with the primary media content item.

5. A system comprising:
a media device including a processor and a memory, the memory storing instructions executable by the processor such that the processor is programmed to:
receive, from a video capture device included in the media device, media data;
store the media data, together with metadata including time indices for each of one or more segments in the media data;
receive user input to generate a primary media content item based on the media data, the user input specifying a start time of the primary media content item, wherein the user input includes data specifying a mental state of the user;
generate the primary media content item from the media data, starting with the segment of the media data having a time index corresponding to the start time;

include the user mental state data in primary metadata associated with the primary media content item; and store the primary media content item;

the system further comprising a computing device including a second processor and a second memory, the second memory storing instructions executable by the second processor such that the second processor is programmed to:

receive, from the processor, the primary media content item and primary metadata;

select, based on the user mental state data, an audio content item; and generate a secondary media content item, based on the primary media content item and the audio content item.

6. The system of claim 5, wherein the second processor is further programmed to:

provide a link to allow purchasing a right to include the audio content item in the secondary media content item.

7. The system of claim 5, wherein the second processor is further programmed to:

provide the secondary media content item to a display device.

8. The system of claim 7, wherein the second processor is further programmed to:

provide, together with the secondary media content item, a link for purchasing the audio content item.

9. The system of claim 5 wherein the second processor is further programmed to:

receive, from a second media device, a second primary media content item;

determine, based on a second primary metadata associated with the second primary media content item and the primary metadata associated with the primary media content item, that the second primary media content item relates to the primary media content item; and generate the second secondary media content item based on the primary media content and the second primary media content item.

10. The system of claim 9, wherein each of the primary metadata associated with the primary media content item and the second primary metadata associated with the second primary media content item include data indicating a respective recording location, and wherein determining that the second primary media content item relates to the primary media content item is based at least in part on the respective recording locations.

11. The system of claim 9, wherein each of the primary metadata associated with the primary media content item and the second primary metadata associated with the second primary media content item include data indicating a respective identity of a user of the media device and a user of the second media device, wherein determining that the second primary media content item relates to the primary media content item is based at least in part on the respective users.

12. The system of claim 4, further comprising a computing device including a second processor and a second memory, the second memory storing instructions executable by the second processor such that the second processor is programmed to:

receive, from the processor, the primary media content item and primary metadata;

select, based on the user mental state data, an audio content item;

generate a secondary media content item, based on the primary media content item and the audio content item; and provide the secondary media content item to a display device.

13. The system of claim 12, wherein the processor is further programmed to:

provide, together with the secondary media content item, a link for purchasing the audio content item.

14. The system of claim 5, wherein the processor is further programmed to:

receive, from a sensor included in the media device, sensor data indicating a field of view of a user of the media device, wherein the data includes a position of a portion of a body of the user relative to a position of the media device; and adjust a field of view of a video capture device in the media device to correspond to the field of view of the user.

15. The system of claim 14, wherein the portion of the body of the user includes the head of the user.

16. The system of claim 14, wherein the portion of the body of the user includes the chin of the user.

17. The system of claim 4, wherein the data includes a position of an eye of the user.

18. The system of claim 1 comprising a computing device including a second processor and a second memory, the second memory storing instructions executable by the second processor such that the second processor is programmed to:

receive, from the media device, the primary media content item including one or more segments, and primary metadata associated with the primary media content item;

receive, from a second media device, a second primary media content item;

determine, based on a second primary metadata associated with the second primary media content item and the primary metadata associated with the primary media content item, that the second primary media content item relates to the primary media content item; and generate the second secondary media content item based on the primary media content and the second primary media content item.

19. The system of claim 18, wherein each of the primary metadata associated with the primary media content item and the second primary metadata associated with the second primary media content item include data indicating a respective recording location, and wherein determining that the second primary media content item relates to the primary media content item is based at least in part on the respective recording locations.

20. The system of claim 18, wherein each of the primary metadata associated with the primary media content item and the second primary metadata associated with the second primary media content item include data indicating a respective identity of a user of the media device and a user of the second media device, wherein determining that the second primary media content item relates to the primary media content item is based at least in part on the respective users.

* * * * *